3,013,002
POLYMERIZATION OF ETHYLENE WITH DICYCLOPENTADIENYL CHROMIUM-METAL ALKYL CATALYSTS
David S. Breslow and Wendell P. Long, Wilmington, Del., assignors to Hercules Powder Company, Wilmington, Del., a corporation of Delaware
No Drawing. Filed Apr. 5, 1960, Ser. No. 19,991
15 Claims. (Cl. 260—88.2)

This invention relates to an improved process for preparing polyethylene and copolymers of ethylene with 1-olefins whereby it is possible to carry out the polymerization at atmospheric or only slightly elevated pressures and at relatively low temperatures and obtain polymers that are desirably free from halogen residues.

Processes for the polymerization of ethylene at relatively low temperatures and pressures employing as a catalyst a compound of a transition element of groups IV to VI of the periodic table in combination with an organometallic compound of a metal of groups I to III of the periodic table have achieved much recognition.

The above description of catalysts useful for the low pressure polymerization of ethylene obviously permits of a vast number of variations. The specific catalysts most often mentioned in the art, however, contain halogen bonded either to the transition metal or to the metal of the organometallic compound because it has been found as a general rule that those catalyst combinations containing halogen in one form or another are the most active. The employment of a halogen-containing catalyst, however, is subject to the disadvantage that halogen residues will be present in the polymer. These halogen residues, if allowed to remain in the polymer, detract from its stability and render it corrosive to metal. Consequently, it is usually desirable to purify the polymer to remove halogen residues, a procedure that adds considerably to the cost of the polymer.

In accordance with the present invention it has been found that polyethylene and copolymers of ethylene with another 1-olefin are rapidly formed upon contacting ethylene or a mixture of ethylene and another 1-olefin with a catalyst comprising a combination of (1) a cyclopentadienyl compound of the RCrR formula where R is selected from the group consisting of cyclopentadienyl and alkyl cyclopentadienyl radicals, and (2) an organometallic compound of the formula $(R_1)nM$ where $R_1$ is an alkyl radical, M is a metal of groups I–A, II–A, II–B, or III–A of the periodic table having an atomic number less than 57, and $n$ is the valence of the metal, said cyclopentadienyl compound having been exposed to a small amount of oxygen.

The cyclopentadienyl compounds that can be used in preparing the catalyst comprise bis(cyclopentadienyl) chromium and derivatives thereof in which one or both of the cyclopentadienyl groups is substituted by an alkyl radical, typical alkyl-substituted cyclopentadienyl radicals including methylcyclopentadienyl, dimethylcyclopentadienyl, ethylcyclopentadienyl, propylcyclopentadienyl, etc.

The organometallic compound that comprises the second component of the catalyst is a compound of a metal of groups I–A, II–A, II–B and III–A of the periodic table having an atomic number less than 57 in which all valences of the metal are satisfied by alkyl substituents. The alkyl groups may be alike or different and preferably are alkyl groups containing from 1 to 18 carbon atoms. Examples of such organometallic compounds are butyllithium, amylsodium, dimethylmagnesium, diethylmagnesium, diethylzinc, triethylaluminum, tripropylaluminum, tributylaluminum, trioctylaluminum, tridodecylaluminum, diethylberyllium, etc., and complexes of such alkyl metallic compounds as, for example, sodium aluminum tetraethyl, lithium aluminum tetraoctyl, etc.

The efficacy of the catalyst depends upon the exposure of the cyclopentadienyl compound to an approximately equimolar amount of oxygen which may be effected either before or after its admixture with the organometallic compound. The chemical significance of this vital treatment with oxygen is not fully understood but it is apparent that the oxygen oxidizes the chromium to a trivalent state, as evidenced by the formation of the characteristic green color of trivalent chromium.

The treatment of the cyclopentadienyl compound with oxygen can be effected by a variety of methods but the simplest and most convenient method is to dissolve the cyclopentadienyl compound in an inert liquid organic diluent and add oxygen thereto, either in the presence or absence of the organometallic compound. When the cyclopentadienyl compound is thus treated in the absence of the organometallic compound, the amount of oxygen to be added is one mole per mole of cyclopentadienyl compound plus or minus about 25%. When the organometallic compound is present during the treatment, larger amounts of oxygen are necessary, the ostensible reason being that some of the oxygen is consumed by the organometallic compound. In the latter case the operable amount of oxygen is from about 0.05 to about 1.2 moles of oxygen per mole of cyclopentadienyl compound and organometallic compound combined, provided that this is equivalent to at least one mole of oxygen per mole of cyclopentadienyl compound. For instance, in the case of a catalyst prepared from 0.005 mmole of bis(cyclopentadienyl)chromium and 0.4 mmole of triethylaluminum, the amount of oxygen can range from about 0.02 to 0.5 mmole.

Whatever may be the method chosen for treating the cyclopentadienyl compound with oxygen, the actual catalyst for the polymerization is a complex reaction product of the individual ingredients thereof, the exact composition of the reaction product being unknown.

The ratio of the two components of the catalyst is fairly widely variable, the operable range of organometallic compound to cyclopentadienyl compound ranging from about 1 to 1000 moles of the former per mole of the latter, more preferably from about 10 to 200 mole per mole of the latter.

The polymerization can be carried out in a wide variety of ways as, for example, either as a batch or continuous operation. The most convenient and preferred procedure is to prepare the catalyst as previously described in an inert liquid organic diluent and then to add ethylene, alone or together with another 1-olefin, continuously or intermittently to the diluent. The concentration of catalyst in the diluent is preferably such as to provide from about 0.5 to about 20 mmoles of organometallic compound and cyclopentadienyl compound combined per liter of diluent. The selection of the temperature and pressure used for the polymerization will depend upon many factors such as the degree of polymerization desired, etc. In general, the polymerization will be carried out at a temperature in the range of from about −20 to 65° C. but more preferably from about −10° to 30° C. In the same way while atmospheric pressure or a pressure of only a few pounds can be used, the polymerization may be carried out over a wide range of pressure, as, for example, from a partial vacuum to about 1000 p.s.i.g. but most preferably from about 1 to 100 p.s.i.g. Preferred diluents are aromatic hydrocarbons such as benzene, toluene, xylene, etc., although other diluents useful in the low pressure polymerization of ethylene can also be employed.

The following examples will illustrate the process of the invention, the molecular weight of the polymers of the examples being evidenced by the reduced specific viscosity (RSV) of each. By the term "reduced specific viscosity" is meant the $\eta_{sp}/c$ determined on a 0.1% solution of the polymer in decahydronaphthalene, containing 0.1 g. of the polymer per 100 milliliters of the solution, at 135° C. All parts and percentages are by weight unless otherwise specified.

*Example 1*

A polymerization vessel was thoroughly evacuated and flushed with nitrogen in order to remove air and moisture. It was charged with 43,000 parts of toluene (which occupied about ⅓ of the reactor volume) and then pressured to 15 p.s.i.g. with ethylene at room temperature. There was then added 3.6 parts of bis(cyclopentadienyl) chromium which dissolved in the toluene. Next, 0.64 part of oxygen was added, resulting in the green color of trivalent chromium. Triethylaluminum was next added in the amount of 87 parts. Ethylene was immediately consumed at a rate causing a pressure drop of 0.3 p.s.i.g. per minute. The polymerization was quenched with ethanol after 48 minutes. Polyethylene was separated by filtration and then washed with toluene and dried. The isolated polymer amounted to 402 parts and had an RSV of 2.0.

*Example 2*

The polymerization vessel was again prepared as described in Example 1 and then charged with 43,000 parts of toluene and the same chromium and aluminum components in the same amounts as in Example 1. Next 3.8 parts of oxygen was added, and thereafter ethylene was continually fed into the vessel to maintain a pressure of 15 p.s.i.g. at room temperature until the polymerization was terminated after 330 minutes. The polymer, isolated as in Example 1, amounted to 3370 parts and had an RSV of 6.8.

*Example 3*

The vessel was again prepared according to Example 1 and then charged with 43,000 parts of toluene, 0.091 part of bis(cyclopentadienyl)chromium and 200 parts of triisobutylaluminum at room temperature. To this combination was added 3.8 parts of oxygen and 3.6 parts of water. Ethylene was continually added to the vessel, the flow being interrupted at intervals only long enough to obtain a reading of the rate of pressure drop. For 30 minutes, until terminated, the polymerization rate remained constant at 2 p.s.i.g. ethylene/minute. The polymer, isolated as in Example 1, weighed 2700 parts and had an RSV of 3.8. Its birefringent melting point was 133° C. and its methyl content less than 0.2% by infrared analysis.

*Example 4*

The vessel held in a bath of ice water was charged with 43,000 parts of toluene, 92 parts triethylaluminum, 3.6 parts of bis(cyclopentadienyl)chromium, 3.8 parts of oxygen and 3.6 parts of water. Ethylene was admitted and maintained at a constant pressure of 15 p.s.i.g. Ethylene was consumed at a rate producing a pressure drop of 1 p.s.i.g. per minute until the reaction was quenched with ethanol after 205 minutes. There was produced 6890 parts solid polymer, RSV 47.6, melting point 135° C.

*Example 5*

The vessel, again prepared as in Example 1, was charged with 43,000 parts of toluene, 3.6 parts of bis-(cyclopentadienyl)chromium, and 87 parts of triethylaluminum at room temperature. Next, 3.8 parts of oxygen and 18 parts of ethanol were added. Introducing ethylene as in Example 3, the rate of polymerization was 0.5 p.s.i.g. ethylene/minute. Isolated polymer amounted to 340 parts, RSV 12.7.

*Example 6*

The vessel was charged at room temperature with 43,000 parts of toluene, 23 parts of bis(cyclopentadienyl) chromium, 3.8 parts oxygen and 92 parts of triethylaluminum; propylene was added to 12 p.s.i.g. and then ethylene to 20 p.s.i.g. The run proceeded overnight and on quenching gave 116 parts of copolymer, RSV 2.3, containing 1.9% methyl groups as determined by infrared indicating the presence of propylene in the copolymer.

*Example 7*

To the polymerization vessel prepared as in Example 1, there was added 43,000 parts of toluene and 27 parts of bis(cyclopentadienyl)chromium followed by 6.4 parts of oxygen, and then by 31 parts of butyllithium. The vessel was pressured to 15 p.s.i.g. with ethylene at room temperature. Overnight the pressure in the vessel dropped to 10 in. Hg vacuum. Isolated polymer amounted to 150 parts, RSV 5.6.

*Example 8*

To the polymerization vessel charged with 43,000 parts of toluene and 5.4 parts of bis(cyclopentadienyl)chromium was added 3.8 parts of oxygen followed by 16 parts of diethylberyllium. The vessel was pressured to 15 p.s.i.g. with ethylene. Pressure dropped overnight to 1 p.s.i.g. Isolated polymer amounted to 63 parts and had an RSV of 7.

As seen from the examples the invention provides a process for the polymerization, including copolymerization, of ethylene which is characterized by the employment of a catalyst that is by definition halogen free and which is characterized by relatively high activity and by the maintenance of activity over a relatively long period of time. Suitable 1-olefins for copolymerization with ethylene by the process of the invention include propylene, butene-1, 2-methylpentene-1, and the like.

In addition to the procedures already discussed for the preparation of the catalyst a subsidiary embodiment of the invention involves the addition of a compound supplying active hydrogen ions during the preparation of the catalyst. This embodiment is illustrated in Examples 3 and 5 where water and ethanol, respectively, are ingredients of the catalyst. While the function of the active hydrogen compound is not understood, it has the effect of reducing the amount of oxygen required for optimum results and causing the catalyst preparations to be more reproducible. The amount of active hydrogen compound, when such is used, can be about 0.2 to 1 mole per mole of cyclopentadienyl compound and organometallic compound combined.

The advantages of the catalyst are apparent. One particular advantage, of course, is the fact that the catalyst does not contain halogen and thus any catalyst residues that remain in the polymer do not cause the polymer to be corrosive to metal or prone to degradation. This means as a practical matter that recovery and purification of the polymer can be materially simplified. Another advantage of the catalyst is that despite its halogen-free character, it has high activity and the ability to retain activity over a substantial period of time.

The periodic table referred to herein is that set forth on pages 392–393 of The Handbook of Chemistry and Physics, 37th edition (1955).

What we claim and desire to protect by Letters Patent is:

1. The process of polymerizing ethylene which comprises contacting ethylene with a catalyst consisting essentially of a combination of (1) a cyclopentadienyl compound of the formula RCrR where R is selected from the group consisting of cyclopentadienyl and alkyl cyclopentadienyl radicals, said alkyl cyclopentadienyl radical being selected from the group consisting of methylcyclopentadienyl, dimethylcyclopentadienyl, ethylcyclopentadienyl and propylcyclopentadienyl radicals, and (2) an organometallic compound of a metal selected from the group consisting of lithium, sodium, magnesium, zinc, aluminum and beryllium wherein all valences of the metal are satisfied by alkyl radicals, said cyclopentadienyl compound having been reacted with an approximately equimolar amount of oxygen during the preparation of the catalyst.

2. The process of polymerizing ethylene in accordance with claim 1 wherein the catalyst is prepared by dissolving the cyclopentadienyl compound in an inert liquid organic diluent, adding an approximately equimolar amount of oxygen to the diluent and then adding the organometallic compound.

3. The process of polymerizing ethylene in accordance with claim 1 wherein the catalyst is prepared by adding the cyclopentadienyl compound and the organometallic compound to an inert liquid organic diluent and then adding oxygen to the diluent in the amount of about 0.05 to about 1.2 moles per mole of cyclopentadienyl compound and organometallic compound combined.

4. The process of claim 2 in which the organometallic compound is a trialkylaluminum.

5. The process of claim 3 in which the organometallic compound is a trialkylaluminum.

6. The process of claim 2 in which the cyclopentadienyl compound is bis(cyclopentadienyl)chromium.

7. The process of claim 3 in which the cyclopentadienyl compound is bis(cyclopentadienyl)chromium.

8. The process of claim 2 in which ethylene is copolymerized with propylene.

9. The process of claim 3 in which ethylene is copolymerized with propylene.

10. The process of claim 4 in which the trialkylaluminum is triethylaluminum.

11. The process of claim 5 in which the trialkylaluminum is triethylaluminum.

12. The process of claim 4 in which the trialkylaluminum is triisobutylaluminum.

13. The process of claim 5 in which the trialkylaluminum is triisobutylaluminum.

14. The process of claim 2 in which a compound containing active hydrogen is added to the diluent in an amount equal to from about 0.2 to 1 mole per mole of cyclopentadienyl compound and organometallic compound combined.

15. The process of claim 3 in which a compound containing active hydrogen is added to the diluent in an amount equal to from about 0.2 to 1 mole per mole of cyclopentadienyl compound and organometallic compound combined.

References Cited in the file of this patent

UNITED STATES PATENTS 2,985,640    Loeb  ---------------- May 23, 1961

FOREIGN PATENTS 806,904    Great Britain ------------ Jan. 7, 1959
1,118,360    France ----------------- Mar. 9, 1959
533,362    Belgium ---------------- May 16, 1955

OTHER REFERENCES

Natta et al., "La Chimica el'Industria," vol. 39 (1957), pages 19–24. Pages 19 and 20 only needed.